(12) United States Patent
Spitz et al.

(10) Patent No.: US 7,236,380 B1
(45) Date of Patent: Jun. 26, 2007

(54) RECTIFIER SYSTEM HAVING DIFFERENT RECTIFIER ELEMENTS

(75) Inventors: Richard Spitz, Reutlingen (DE); Alfred Goerlach, Kusterdingen (DE); Gert Wolf, Affalterbach (DE); Markus Mueller, Heilbronn (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/563,388

(22) PCT Filed: Jun. 26, 2004

(86) PCT No.: PCT/DE2004/001352

§ 371 (c)(1),
(2), (4) Date: Jan. 4, 2006

(87) PCT Pub. No.: WO2005/006529

PCT Pub. Date: Jan. 20, 2005

(30) Foreign Application Priority Data

Jul. 4, 2003  (DE) ............................... 103 30 258

(51) Int. Cl.
*H02M 1/14*  (2006.01)

(52) U.S. Cl. ........................................ 363/45; 363/126

(58) Field of Classification Search .................. 363/44, 363/45, 125, 126
See application file for complete search history.

(56) References Cited

U.S. PATENT DOCUMENTS

| | | | | |
|---|---|---|---|---|
| 3,953,781 A | * | 4/1976 | Forster et al. | 363/70 |
| 4,447,868 A | * | 5/1984 | Turnbull | 363/81 |
| 4,449,176 A | * | 5/1984 | Turnbull | 363/81 |
| 4,924,371 A | * | 5/1990 | Peterson | 363/89 |
| 5,200,887 A | * | 4/1993 | Ioroi et al. | 363/143 |
| 6,038,155 A | * | 3/2000 | Pelly | 363/129 |
| 6,222,749 B1 | * | 4/2001 | Peron | 363/125 |
| 6,411,535 B1 | * | 6/2002 | Roux | 363/124 |
| 6,538,910 B1 | * | 3/2003 | Spitz et al. | 363/126 |
| 6,738,274 B2 | * | 5/2004 | Prasad et al. | 363/70 |

FOREIGN PATENT DOCUMENTS

| | | |
|---|---|---|
| EP | 1 102 389 | 5/2001 |
| FR | 2 648 966 | 12/1990 |
| JP | 60 043071 | 3/1985 |

* cited by examiner

*Primary Examiner*—Jeffrey Sterrett
(74) *Attorney, Agent, or Firm*—Kenyon & Kenyon LLP

(57) ABSTRACT

A rectifier system, in particular a rectifier bridge for a three-phase generator, includes a plurality of rectifier elements, specifiable rectifier elements being different from the other rectifier elements in at least one property. The rectifier elements are, for example, diodes which differ from one another with regard to the following properties: switching time or the reverse recovery switching time and/or current density and/or chip area and/or chip thickness and/or the breakdown voltage and/or internal resistance and/or path resistance and/or with regard to another property which is suited for reducing ripple.

14 Claims, 1 Drawing Sheet

RECTIFIER SYSTEM HAVING DIFFERENT RECTIFIER ELEMENTS

BACKGROUND INFORMATION

Rectifiers for motor vehicle three-phase generators are normally equipped with 6 silicon diodes which are connected to form a bridge. It is a characteristic of all of these rectifier configurations that they generally are either equipped only with high-blocking diodes, i.e., diodes without a voltage limiting function, or Zener diodes, i.e., diodes having a voltage limiting function. In doing so, only semiconductor diodes of the same type are used. An exception is rectifiers in which an additional pair of diodes is connected to the star point of the generator stator winding. For reasons of cost, the star point diodes in this case are sometimes designed as high-blocking diodes while, however, the phase diodes are designed as Zener diodes.

Rectifiers having 7, 8, 12, 14 or more diodes are also in use. In doing so, the number of diodes is then doubled from 6 to 12, when high temperature or current demands in particular must be met. The diodes are then connected in such a way that two diodes are connected in parallel.

The level of the rectified signal, i.e., the generator current or the generator voltage, shows a characteristic variation which is a function of different influence factors. This variation is known as generator ripple. The reverse recovery time trr of the diodes makes a significant contribution to generator ripple. Reverse recovery time trr is a form of switching time.

When conventional generators are operated at high speeds and large currents, the voltage ripple or current ripple increases strongly because the current sloped IF/dt to be switched increases.

SUMMARY

An example rectifier system according to the present invention may have the advantage that the voltage ripple or current ripple stays low even at high speeds and large currents, making it possible to use the rectifiers even in generators having high output. According to an example embodiment of the present invention, a rectifier system, in particular a rectifier bridge, includes a plurality of rectifier elements and is designed in such a way that specifiable rectifier elements differ from the other rectifier elements in at least one property. The rectifier elements may advantageously be diodes.

It may be advantageous in particular that it is also possible to reduce significantly the voltage ripple or current ripple in rectifier systems which are intended to remain functional at very high currents by doubling the number of diodes used and connecting every two diodes in parallel, the diodes connected in parallel having at least one different property.

The properties with regard to which the rectifier elements or diodes used differ from one another may advantageously be the switching time or the reverse recovery switching time (trr) and/or the current density and/or the chip area and/or the chip thickness and/or the breakdown voltage (UZ) and/or the internal resistance (RI) and/or the path resistance and/or another property which is suited for reducing ripple. The combination of the diodes having the advantageous properties is selectable based on requirements. Other combinations of diodes which differ in at least one property are conceivable both for rectifiers having 6 but also 12 diodes.

BRIEF DESCRIPTION OF THE DRAWINGS

One exemplary embodiment of the present invention is depicted in the figures and is explained below.

DETAILED DESCRIPTION OF EXAMPLE EMBODIMENTS

Figure 1:
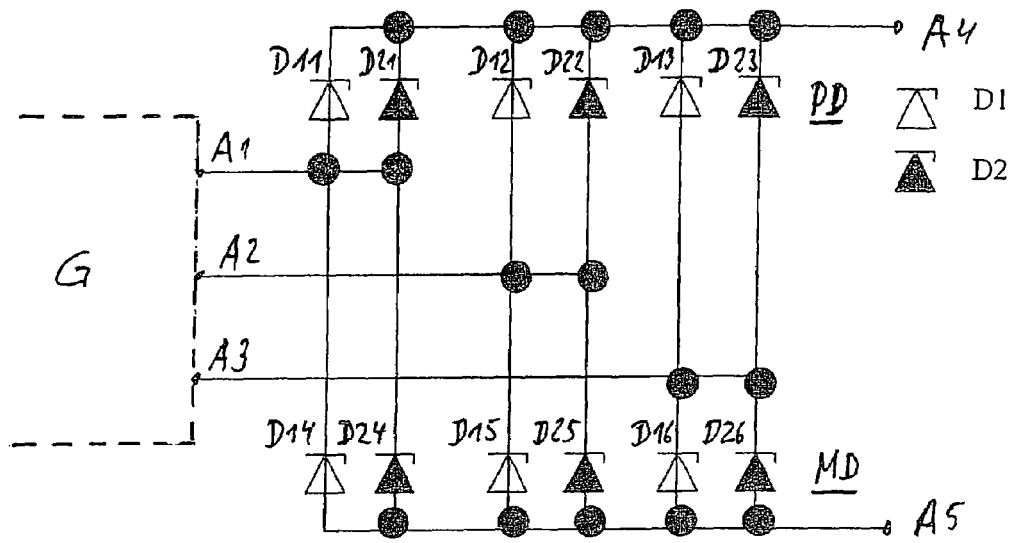
FIG. 1 shows an embodiment of a rectifier bridge according to the present invention having different rectifier elements.

One exemplary embodiment of a rectifier system is shown in FIG. 1.

This rectifier system includes a rectifier bridge having six positive diodes PD and six negative diodes MD, thus a total of 12 diodes, diodes D11 through D16 (D1) being different from diodes D21 through D26 (D2) in at least one property. The diodes according to the exemplary embodiment are Zener diodes; suitable rectifier elements may generally be used. Every two diodes having different properties are connected in parallel, for example, diode D11 and diode D21.

The rectifier bridge may be connected to a generator G via terminals A1, A2, A3, it being generally possible to feed the signal to be rectified, i.e., a voltage or a current, via these terminals. The rectified signal appears at terminals A4 and A5. Normally, terminal A5 is connected to ground.

The parallel connection of specifiable diodes makes the rectifier system shown in FIG. 1 suitable for use with generators having very high currents and it is still able to process the high output given off by the generator even at high speeds, i.e., to rectify the generator voltage or the generator current.

Diodes D1 and D2, as well as D11 through D16 and D21 through D26 differ from one another with regard to at least one property, if necessary also in a combination of properties, this property or properties being the switching time or the reverse recovery switching time (trr) and/or the current density and/or the chip surface and/or the chip thickness and/or the breakdown voltage (UZ) and/or internal resistance (RI) and/or the path resistance or another property which is suited for reducing ripple.

In addition to the example embodiment shown in FIG. 1, other combinations of diodes or rectifier elements are also possible. For example, the "lower," i.e., the minus diodes may be made up of only one diode type. All of diodes MD would then be of the same type while positive diodes PD differ with respect to D1 and D2. The reverse system is also possible.

Another example embodiment uses different diode types or diodes having different properties in only one or two lines. Additional embodiments may include nine diodes, for example, six positive diodes connected in parallel in the manner described and three negative diodes MD.

Figure 2:
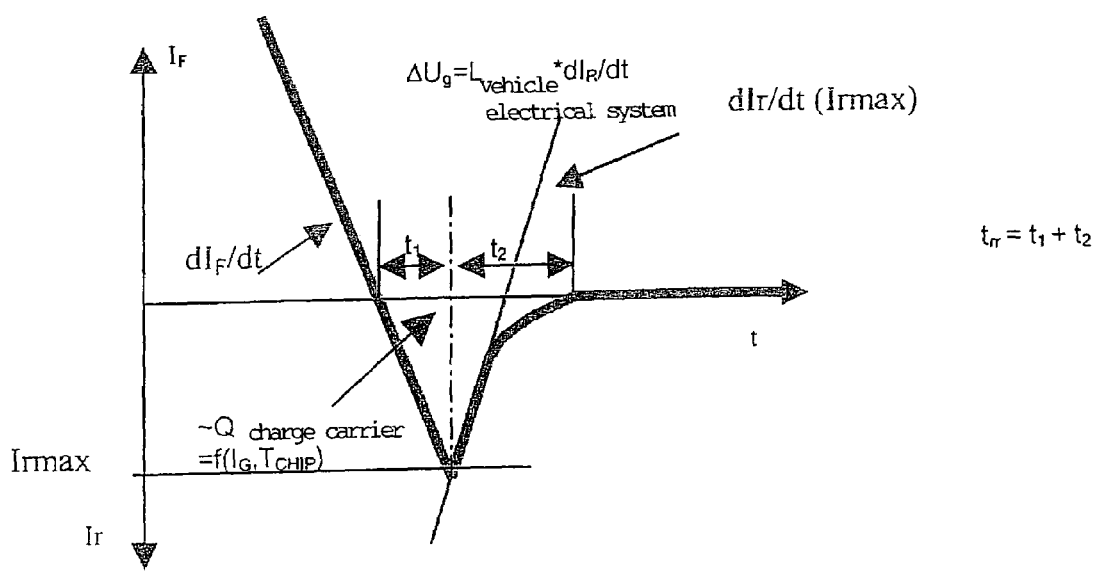
FIG. 2 schematically depicts the variation of the diode current over time during a switching operation.

FIG. 2 shows the basic curve of diode current IF during a switching-off operation over time t. In this connection, it should be noted that when a high diode current having a gradient dIF/dt is switched off at the point in time of the transition from flow to blocking polarity for a specific period of time, reverse recovery time trr causes a current to flow in reverse direction Ir because minority charge carriers in the diode must be cleared out or reduced first, the following being the case: Qcharge carrier=f(IG, TCHIP). Reverse recovery time trr may be divided into a time segment t1 and a time segment t2.

Frequently, current chopping in second time segment t2 is very abrupt, i.e., current change dIr/dt at maximum reverse current Irmax is very great. Irmax represents the reverse current recovery point. The above conditions have the result that only a low soft factor is obtained. Soft factor denotes the relationship s=t2/t1.

It is possible to estimate the resulting voltage ripple at ΔUg=LBN*dIr/dtmax where:

tmax: time of maximum current change dIr/dt is generally identical to the point in time of the maximum reverse current.

LBN: vehicle electrical system inductance

If diodes having different reverse recovery times are now connected in parallel, it is possible to set the current chopping to be softer, i.e., having a lower Ir/dtmax. This is expressed in lower ripple of the rectified voltage and accordingly of the rectified current. According to an example embodiment of the present invention, it is thus possible to reduce ripple by using specific diodes or rectifier elements.

According to the present invention, a diode D1 having a high soft factor s1 and a diode D2 having a low soft factor s2 are connected in parallel. If diode D1 is operated at a 20%–40% lower current density than diode D2, for example, the diodes reach the reverse current recovery point at different times. This results in soft switching overall, i.e., in a higher soft factor of the entire system.

When used in a rectifier system having a plurality of rectifier elements, diodes in particular, it is possible to design the rectifier system in such a way that parallel circuits of diodes having different properties are used at specifiable places, it being necessary to select the diodes with consideration of the effects to be obtained. A preferred application for the rectifier bridge is in a high-output generator in a motor vehicle.

In summary, the present invention may be used to obtain a reduction of generator ripple by connecting in parallel diodes having different reverse recovery properties and/or different current densities. In order to obtain the different reverse recovery characteristics, it is possible to use diodes having different breakdown voltages and, for example, semiconductor diodes in the Zener voltage range of 18 volts through 50 volts combined with diodes in the Zener voltage range of 100 volts through 800 volts. Different current densities may be implemented through different chip areas and/or different chip thicknesses and/or different path resistances of the semiconductors.

What is claimed is:

1. A rectifier system, comprising:
   a rectifier bridge for a three-phase generator, the rectifier bridge including a plurality of rectifier elements, wherein at least some of the rectifier elements are different from others of the rectifier elements in at least one property;
   wherein the rectifier elements have properties selected in such a way that one of: i) ripple of a voltage which can be picked off an output of the rectifier system is minimal or ii) ripple of a current which can be picked off at the output of the rectified system is minimal.

2. The rectifier system as recited in claim 1, wherein the rectifier elements are diodes.

3. The rectifier system as recited in claim 2, wherein the diodes are Zener diodes.

4. The rectifier system as recited in claim 1, wherein the at least some of the rectifier elements are parallel connections of two diodes having different properties.

5. The rectifier system as recited in claim 4, wherein the two diodes have, relative to each other, one of different switching times or different reverse recovery switching times.

6. The rectifier system as recited in claim 4, wherein the two diodes have different reverse recovery switching times, the different reverse recovery switching times being achieved by using diodes having different breakdown voltages.

7. The rectifier system as recited in claim 6, wherein one of the two diodes is in a Zener voltage range of 18 volts through 50 volts and the other of the two diodes is in a Zener voltage range of 100 volts through 800 volts.

8. The rectifier system as recited in claim 6, wherein the at least one property includes different current densities, the different current density of the rectifier elements being implemented through different at least one of: i) chip areas, ii) chip thicknesses, and iii) path resistances.

9. The rectifier system as recited in claim 1, wherein the rectifier elements in the rectifier bridge include twelve diodes, pairs of the twelve diodes having different properties and being connected in parallel.

10. The rectifier system as recited in claim 1, wherein the rectifier elements in the rectifier bridge include twelve diodes, pairs of the diodes being connected in parallel, only positive pairs of diodes having different properties relative to one another.

11. The rectifier system as recited in claim 1, wherein the rectifier elements in the rectified bridge include twelve diodes, pairs of the diodes being connected in parallel, only negative pairs of diodes having different properties relative to one another.

12. The rectifier system as recited in claim 1, wherein the rectifier elements in the rectifier bridge include twelve diodes, four of the diodes having a first property and eight diodes having a second property, the first and second properties being different from one another.

13. The rectifier system as recited in claim 1, wherein the rectifier bridge has nine diodes.

14. A rectifier system, comprising:
   a rectifier bridge for a three-phase generator, the rectifier bridge including a plurality of rectifier elements, wherein at least some of the rectifier elements are different from others of the rectifier elements in at least one property;
   wherein the at least one property is at least one of: i) a switching time, ii) a reverse recovery switching time, iii) a current density, iv) a chip area, v) a chip thickness, vi) a breakdown voltage, vii) an internal resistance, viii) a path resistance, and ix) another property which is suited for reducing ripple.

* * * * *